United States Patent
Shin et al.

(10) Patent No.: US 9,694,714 B2
(45) Date of Patent: Jul. 4, 2017

(54) APPARATUS FOR INCREASING PERFORMANCE MARGIN OF CLASSIFYING PASSENGERS IN VEHICLE

(71) Applicants: Hyundai Motor Company, Seoul (KR); KIA MOTORS CORP., Seoul (KR)

(72) Inventors: Pyoung Sik Shin, Yongin-si (KR); Jong Young Yoon, Suwon-si (KR); Nam Gyun Kim, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 153 days.

(21) Appl. No.: 14/687,847

(22) Filed: Apr. 15, 2015

(65) Prior Publication Data

US 2016/0144741 A1   May 26, 2016

(30) Foreign Application Priority Data

Nov. 20, 2014  (KR) .................. 10-2014-0162896

(51) Int. Cl.
  *G01G 5/04*   (2006.01)
  *G01G 19/08*  (2006.01)
  (Continued)

(52) U.S. Cl.
  CPC .............. *B60N 2/002* (2013.01); *G01G 5/04* (2013.01); *G01G 19/08* (2013.01); *G01G 19/4142* (2013.01)

(58) Field of Classification Search
  CPC ........ B60N 2/002; G01G 19/08; G01G 19/10; G01G 19/4142; G01G 5/04; G01G 5/045; G01G 5/06
  See application file for complete search history.

(56) References Cited

U.S. PATENT DOCUMENTS 6,056,079 A  *  5/2000  Cech ...................... B60N 2/002
                                                                177/144
6,578,871 B2 *  6/2003  Gray ................. B60R 21/01526
                                                                280/735

(Continued)

FOREIGN PATENT DOCUMENTS

JP       2001-074542 A    3/2001
KR   10-2001-0031876 A    5/2000
(Continued)

*Primary Examiner* — Randy Gibson
(74) *Attorney, Agent, or Firm* — McDermott Will & Emery LLP

(57) ABSTRACT

An apparatus for classifying a passenger in a vehicle includes a seat cushion for a seat in the vehicle, the seat cushion having an adult detection area and a child detection area. A first chamber is disposed in the adult detection area and a second chamber is disposed in the child detection area. A margin improvement unit includes a pressure sensor configured to measure a first pressure based on a first weight applied to the first chamber and a second pressure based on a second weight applied to the second chamber. The margin improvement unit is configured to output a first adjusted pressure value based on the first pressure and a second adjusted pressure value based on the second pressure. The first adjusted pressure value is greater than the second adjusted pressure value when the first weight is substantially equal to the second weight.

7 Claims, 4 Drawing Sheets

(51) Int. Cl.
    *G01G 19/414*    (2006.01)
    *B60R 21/015*    (2006.01)
    *B60N 2/00*      (2006.01)

(56) References Cited

U.S. PATENT DOCUMENTS

| | | | |
|---|---|---|---|
| 6,816,077 B1 * | 11/2004 | Shieh | B60R 21/01532 |
| | | | 180/273 |
| 6,876,299 B2 * | 4/2005 | Sakai | B60N 2/002 |
| | | | 280/735 |
| 6,922,152 B2 * | 7/2005 | Sumi | B60N 2/002 |
| | | | 280/730.1 |
| 7,102,527 B2 * | 9/2006 | Shieh | B60R 21/01532 |
| | | | 180/273 |
| 7,730,794 B2 * | 6/2010 | Hwang | B60N 2/002 |
| | | | 180/273 |
| 7,779,956 B2 * | 8/2010 | Breed | B60N 2/002 |
| | | | 177/136 |
| 2008/0319697 A1 * | 12/2008 | Gray | B60N 2/002 |
| | | | 702/98 |

FOREIGN PATENT DOCUMENTS

| | | |
|---|---|---|
| KR | 10-2000-0064583 A | 11/2000 |
| KR | 10-2004-0022833 A | 3/2004 |
| KR | 10-0856987 B1 | 8/2008 |
| KR | 10-2009-0126549 A | 12/2009 |
| KR | 10-2010-0004697 A | 1/2010 |
| KR | 10-2011-0121940 A | 11/2011 |

* cited by examiner

APPARATUS FOR INCREASING PERFORMANCE MARGIN OF CLASSIFYING PASSENGERS IN VEHICLE

CROSS REFERENCE TO RELATED APPLICATION

The present application claims priority to Korean Patent Application No. 10-2014-0162896, filed Nov. 20, 2014, the entire contents of which is incorporated herein for all purposes by this reference.

TECHNICAL FIELD

The present disclosure relates to an apparatus for classifying passengers in vehicles as adults or small children.

BACKGROUND

In case of an accident, if a small child is sitting in a passenger seat with an airbag, the apparatus for classifying passengers detects the passenger and does not deploy the airbag to protect the small child.

Conventional apparatuses for classifying passengers adopt a method using dielectric permittivity of an object on a seat in order to classify passengers as small children or adults. Another method is to classify passengers as small children or female adults using two strain gauge sensors installed at a position where a seat frame is mounted.

FIG. 1 is a view illustrating a conventional apparatus for classifying passengers in vehicles. A thin bladder 1 filled with liquid is installed under a seat cushion, and a pressure sensor 2 senses an amount of liquid leaking out of the bladder 1 to classify passengers as small children or female adults.

Also, a BTS (belt tension sensor) 3 mounted to a seat belt measures belt tension to detect small children.

However, in case of the above conventional methods, as such a device demands a costly BTS, the price or weight of the device may be increased. Additionally, freedom of buckle design is reduced and a packaging problem may occur.

The foregoing is intended merely to aid in the understanding of the background of the present inventive concept, and is not intended to mean that the present inventive concept falls within the purview of the related art that is already known to those skilled in the art.

SUMMARY

Accordingly, the embodiments of the present inventive concept have been made keeping in mind the above problems, and an object of the present inventive concept is to provide an apparatus for classifying passengers in vehicles, which increases a performance margin.

An apparatus for classifying a passenger in a vehicle may include: a seat cushion for a seat in the vehicle, the seat cushion having an adult detection area and a child detection area; a first chamber, disposed in the adult detection area; a second chamber disposed in the child detection area; and a margin improvement unit including at least one pressure sensor configured to measure a first pressure based on a first weight applied to the first chamber and a second pressure based on a second weight applied to the second chamber. The margin improvement unit may be configured to output a first adjusted pressure value based on the first pressure and a second adjusted pressure value based on the second pressure the first weight is substantially equal to the second weight.

The seat cushion has a front portion and a rear portion. In certain embodiments, the first chamber may be disposed in the rear portion of the seat cushion and the second chamber disposed in the front portion of the seat cushion.

In certain embodiments, the at least one pressure sensor may include first and second pressure sensors. The first pressure sensor may be configured to measure the first pressure, and the second pressure sensor may be configured to measure the second pressure.

A control unit may be included to classify a passenger as an adult or as a small child according to at least one of the first and second adjusted pressure values output by the margin improvement unit.

In certain embodiments, the margin improvement unit may further include a first tube connecting the first chamber to the pressure sensor, and a second tube connecting the second chamber to the pressure sensor. The first and second tubes may be configured to deliver working fluids to the pressure sensor. The first tube may have a smaller cross-sectional area than the second tube.

In certain embodiments, the margin improvement unit may set a first gain value for the first weight or the first pressure and a second gain value for the second weight or the second pressure. The first gain value may be greater than the second gain value.

In certain embodiments, a temperature sensor may be included to measure a temperature of the passenger who sits on the seat, and the control unit may compensate at least one of the first and second pressures according to the temperature measured by the temperature sensor.

In certain embodiments, when the seat is replaced with a new one, the control unit may learn a value for a vacant seat when changing seats and compensate at least one of the first and second pressures.

In certain embodiments, the control unit may compensate at least one of the first and second pressures according to whether ALR is connected.

In certain embodiments, the control unit may determine whether an abnormal seating condition is satisfied, in which the first pressure or the second pressure is greater than a reference value and classify the passenger according to whether the abnormal seating condition is satisfied.

BRIEF DESCRIPTION OF THE DRAWINGS

The above and other objects, features and other advantages of the present inventive concept will be more clearly understood from the following detailed description taken in conjunction with the accompanying drawings, in which.

DETAILED DESCRIPTION

Exemplary embodiments according to the present inventive concept will be described in detail referring to accompanying drawings.

An apparatus for classifying passengers in vehicles according to an embodiment of the present inventive concept includes a plurality of chambers 12, a pressure sensor 14, and a margin improvement unit 15.

Figure 1:
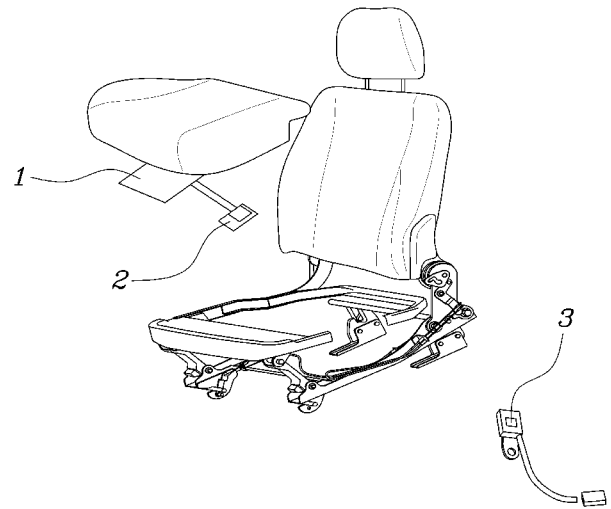
FIG. 1 is a view illustrating an apparatus for classifying passengers in vehicles according to a conventional art.
Figure 2:
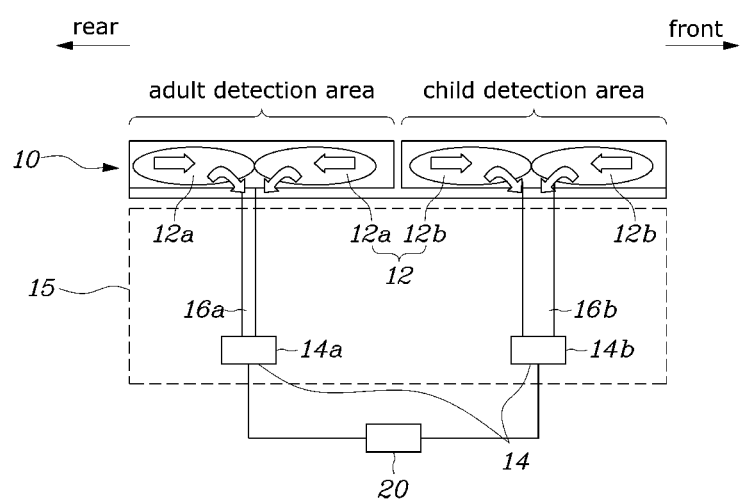
FIG. 2 is a view illustrating a first embodiment of a margin improvement unit in an apparatus for classifying passengers in vehicles according to the present inventive concept.
Figure 3:
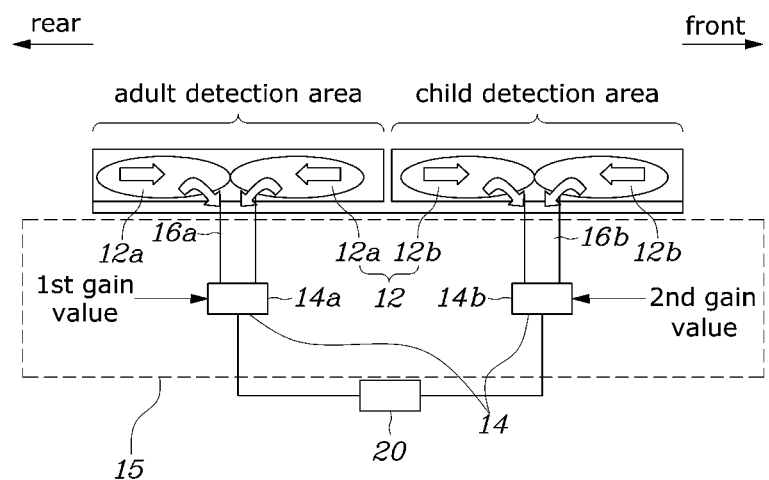
FIG. 3 is a view illustrating a second embodiment of a margin improvement unit in an apparatus for classifying passengers in vehicles according to the present inventive concept.
Figure 4:
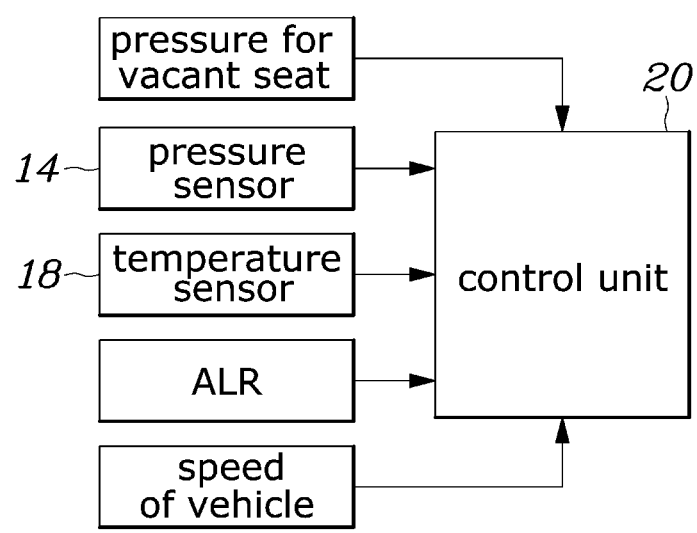
FIG. 4 is a schematic view illustrating an operation of a control unit and a connection between the control unit and sensors.

Concretely describing an embodiment of the present inventive concept referring to FIGS. 2 and 3, the chambers 12 are mounted in a seat cushion 10. The seat cushion has an adult detection area and a child detection area. The chambers 12 are arranged according to the detection areas.

The adult detection area is mainly for detecting an adult, and the child detection area is mainly for detecting a small child. At least one of the chambers 12 may be installed in each area. In certain embodiments, the chambers 12 may be filled with working fluids.

In certain embodiments, a first chamber 12a, of the adult detection area, may be disposed at the rear of the seat cushion 10, and a second chamber 12b, of the child detection area, may be disposed in the front of the seat cushion 10.

However, the configuration mentioned above is just an embodiment. One or more chambers 12 may be installed in each the adult detection area and child detection area. The pressure sensor 14 measures pressures applied to each of the chambers 12. In certain embodiments, the pressure sensor 14 may measure a first pressure, applied to the first chamber 12a, and a second pressure, applied to the second chamber 12b. Alternatively, in certain embodiments, individual pressure sensors 14 may measure pressures applied to each of the chambers 12. For example, a first pressure sensor 14a may measure the first pressure, applied to the first chamber 12a, and a second pressure sensor 14b may measure the second pressure, applied to the second chamber 12b. In certain embodiments, the pressure sensor 14 or the pressure sensors 14a and 14b may recognize weight applied to each of the chambers 12 as a pressure value corresponding to the weight. Particularly, when the same weight is input to both the first chamber 12a, of the adult detection area, and the second chamber 12b, of the child detection area, a margin improvement unit 15 according to an embodiment of the present inventive concept may be configured to output a first pressure value corresponding to the adult detection area, and a second pressure value, corresponding to the child detection area, wherein the first pressure value is greater than the second pressure value. The margin improvement unit 15 may output a first pressure value that is greater than the second pressure value, even though the corresponding applied weights may be the same.

Also, a control unit 20 may classify passengers as adults or small children according to the pressure value of at least one of the adult detection area or of the child detection area, which is input by the margin improvement unit 15.

According to the above description, when an adult passenger sits down on a seat, the apparatus of an embodiment of the present inventive concept increases a pressure value measured in the adult detection area compared to the conventional art through the margin improvement unit 15, and outputs the increased pressure value. Therefore, a gap between pressure values of a small child and adult is represented to be high, and thus the performance margin of classifying passengers is increased. Consequently, it is possible to clearly classify passengers as adults or small children.

Also, when a small child passenger sits down on a seat, it is possible to detect the seating of the small child by a pressure value measured in the child detection area.

On the other hand, a first embodiment of a margin improvement unit 15 may be implemented by varying diameters of a first tube 16a and a second tube 16b that respectively connect the first chamber 12a and the second chamber 12b to the pressure sensor 14. In certain embodiments, there may be a single pressure sensor 14 that is connected to both the first tube 16a and the second tube 16b. In other embodiments, a first pressure sensor 14a is connected to the first tube 16a, and a second pressure sensor 14b is connected to the second tube 16b.

Referring to the embodiment shown in FIG. 2, the first tube 16a connected between the first chamber 12a and the first pressure sensor 14a delivers the weight that is applied to the first chamber 12a by flowing of working fluids to the pressure sensor 14.

In other words, when the weight of a passenger is applied to the chamber 12, the weight is applied to the working fluids inside the chamber 12, and the weight is delivered to the pressure sensor 14 through the tube 16. Accordingly, the pressure sensor 14 may measure a pressure value corresponding to the weight.

In certain embodiments, the first tube 16a connected to the first chamber 12a of the adult detection area has a smaller cross-section area than the second tube 16b connected to the second chamber 12b of the child detection area.

In certain embodiments, as the first tube 16a connected to the first chambers 12a has a different diameter than the second tube 16b connected to the second chamber 12b, the pressure delivered to the pressure sensor 14 may vary.

For example, when the diameter of the first tube 16a connected to the first chamber 12a is set to ½ of the diameter of the second tube 16b connected to the second chamber 12b, the pressure doubles.

Consequently, as the pressure measured in the adult detection area is highly increased, a performance margin of classifying passengers is increased so as to clearly classify passengers as adults or small children.

On the other hand, a second embodiment of a margin improvement unit 15 may be implemented by differently setting a gain value for adjusting the pressure values respectively measured in the adult detection area and child detection area. A third embodiment of a margin improvement unit 15 combines elements of the first and second embodiments.

Referring to FIG. 3, in certain embodiments, in the control unit 10, the margin improvement unit 15 sets a gain value for the weight or for the pressure, both of which are measured in the first and second chambers 12a and 12b of the adult detection area and child detection area, respectively. In certain embodiments, the gain value for the adult detection area may be set to be higher than the gain value for the child detection area.

In certain embodiments, a larger gain value is set for the pressure value measured in the adult detection area, while a smaller gain value is set for the pressure value measured in the child detection area.

For example, when the gain value of the adult detection area is set to be two times higher than the gain value of the child detection area, capability to detect an adult's seating may be increased.

Consequently, as in certain embodiments, the pressure value measured in the adult detection area is highly increased, a performance margin of classifying passengers as adults or small children is increased, whereby performance of classifying passengers is improved.

Additionally, in certain embodiments, the control unit 20 may have capability to recognize a passenger's seating pattern by receiving temperature, ALR (Automatic Locking Retractor) connection signal, speed of a vehicle, and the like, as well as the pressure value.

For example, in certain embodiments, a temperature sensor 18 may be included to measure temperature of a passenger who seats on the seat cushion 10.

Accordingly, in certain embodiments, the control unit 20 may compensate the pressure measured in the adult detection area and child detection area according to the temperature measured by the temperature sensor 18.

This compensation may be desirable because even though the passengers with the same weight are seated, the pressure may vary depending on the temperature. Accordingly, the control unit 20 may compensate the pressure depending on the temperature.

Additionally, in certain embodiments, when the seats in the vehicle are replaced, the control unit 20 may compensate the pressure value measured in the adult detection area and child detection area by learning values for a vacant seat.

When seats are replaced due to aging of seat trims or by provision of new seats, the value for the new vacant seat may be different from the value for the previous vacant seat. Accordingly, it is necessary to learn the value for the vacant seat, and the pressure value is compensated according to the learned value. Therefore, reliability and robustness of performance of classifying passengers are improved.

Also, in certain embodiments, when receiving a signal of ALR connection as an input, the control unit 20 may determine whether ALR is connected, and according to that, may compensate the pressure value measured in the adult detection area and child detection area.

In certain embodiments, the ALR is a seat belt to fasten a child seat.

Often, when connecting the ALR, pressure caused by the ALR connection increases the weight of a small child, and thus the pressure value may be increased. Therefore, as the passenger may be wrongly recognized as an adult, it is desirable to compensate the pressure value according to whether the ALR is connected.

Also, the control unit 20 may classify passengers by determining whether an abnormal seating condition is satisfied, in which a pressure value more than a reference value is input to either the first chamber 12a, of the adult detection area, or the second chamber 12b, of the child detection area.

For example, in embodiments where the first chamber 12a, of the adult detection area, is disposed at the rear of the seat cushion 10, when an adult passenger sits such that his or her buttocks is close to the seatback, the weight of the passenger is distributed to the first chamber 12b disposed at the rear of the seat cushion 10 and to the seatback. Accordingly, the weight of the passenger may not be applied to the front of the seat cushion 10.

In other words, in the case of the abnormal seating pose described above, as only about 50% of a reference weight of the adult passenger may be detected in the first chamber 12a, is the weight of the adult passenger may be measured less than a reference weight that includes the sum of the weight of a small child and the weight of a dummy. Consequently, when the abnormal seating condition is satisfied as described above, even though the measured weight detected in the first chamber 12a, which in this embodiment is at the rear of the seat, may be less than the reference weight it may be determined that an adult passenger is seated. For another example, in embodiments where the second chamber 12b, of the child detection area, is disposed in the front of the seat cushion 10, when an adult passenger sits down on a seat in slouched position, or when he or she lies down on the seat such that his or her buttocks is located on the front part of the seat cushion 10, the weight of the passenger may be distributed to the second chamber 12b disposed in the front of the seat cushion 10 and to the passenger's feet. In this case, the weight of the passenger may not be applied to the rear of the seat cushion 10.

In other words, in the case of the abnormal seating pose described above, only about 50% of a reference weight of the adult passenger is detected in the front chamber 12, and thus the measured weight may be less than a reference weight that includes the sum of the weight of a small child and the weight of a dummy. Consequently, when the abnormal seating condition is satisfied as described above, even though the weight detected in the second chamber 12b, disposed in the front of the seat, may be less than the reference weight, it may be determined that an adult passenger is seated.

Figure 5:
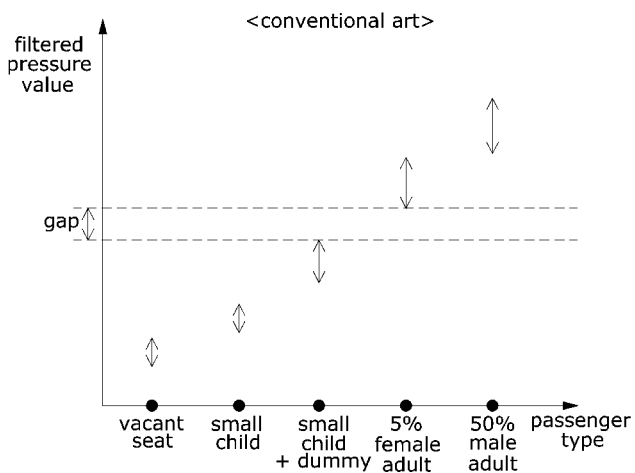
FIG. 5 is a graph that compares a performance margin of classifying passengers in an apparatus for classifying passengers according to an embodiment the present inventive concept with that of an apparatus according to conventional art.
Figure 5:
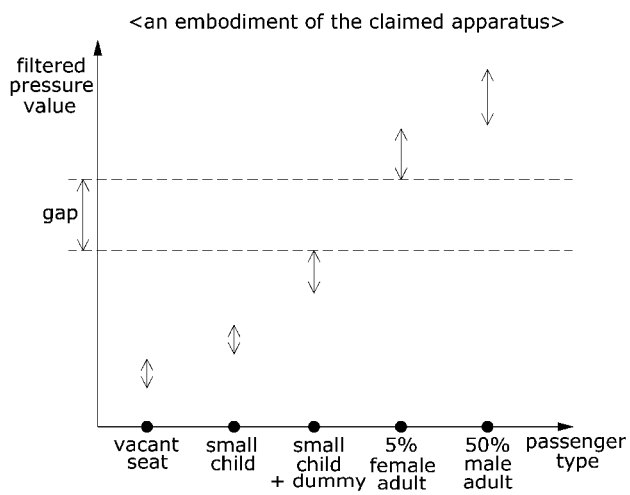

As described above, when an adult passenger sits down on a seat, in certain embodiments, a pressure value measured in an adult detection area is increased compared to conventional art through a margin improvement unit 15, and the increased value is output. Therefore, a performance margin of classifying passengers is increased. An apparatus of certain embodiments of the present inventive concept has the capability to recognize a passenger's seating pattern by revising the pressure value according to one or more of a temperature of a passenger, the weight of an empty vehicle, and an ALR connection. Therefore, a gap between pressure values of a small child and adult is represented to be high as shown in FIG. 5. Consequently, performance of classifying passengers is highly improved, whereby it is possible to clearly classify passengers as adults or small children.

Although embodiments of the present inventive concept have been disclosed for illustrative purposes, those skilled in the art will appreciate that various modifications, additions and substitutions are possible, without departing from the scope and spirit of the inventive concept as disclosed in the accompanying claims.

What is claimed is:

1. An apparatus for classifying a passenger in a vehicle, comprising:
   a seat cushion for a seat in the vehicle, the seat cushion having an adult detection area and a child detection area;
   a first chamber disposed in the adult detection area;
   a second chamber disposed in the child detection area;
   at least one pressure sensor configured to measure a first pressure based on a first weight applied to the first chamber and a second pressure based on a second weight applied to the second chamber;
   a first tube connecting the first chamber to the pressure sensor, and a second tube connecting the second chamber to the pressure sensor to output a first adjusted pressure value based on the first pressure and a second adjusted pressure value based on the second pressure, respectively, wherein the first adjusted pressure value is greater than the second adjusted pressure value when the first weight is substantially equal to the second weight; and
   a control unit for classifying a passenger as an adult or as a small child according to at least one of the first and second adjusted pressure values, wherein the first and second tubes deliver a working fluid to the pressure sensor, wherein the first tube has a smaller cross-sectional area than the second tube, and wherein the control unit sets a first gain value for the first weight or for the first pressure and a second gain value for the second weight or the second pressure, in which the first gain value is greater than the second gain value.

2. The apparatus of claim 1, wherein the seat cushion has a front portion and a rear portion, the first chamber is disposed in the rear portion, and the second chamber is disposed in the front portion.

3. The apparatus of claim 1, wherein the at least one pressure sensor includes first and second pressure sensors, the first pressure sensor is configured to measure the first pressure, and the second pressure sensor is configured to measure the second pressure.

4. The apparatus of claim 1, further comprising a temperature sensor configured to measure a temperature of the passenger who sits on the seat, wherein the control unit compensates at least one of the first and second pressures according to the temperature measured by the temperature sensor.

5. The apparatus of claim 1, wherein when the seat is replaced with a new one, the control unit learns a value for a vacant seat and compensates at least one of the first and second pressures.

6. The apparatus of claim 1, wherein the control unit compensates at least one of the first and second pressures according to whether ALR is connected.

7. The apparatus of claim 1, wherein the control unit determines whether an abnormal seating condition is satisfied, in which the first pressure or the second pressure is greater than a reference value, and classifies the passenger according to whether the abnormal seating condition is satisfied.

* * * * *